United States Patent

[11] 3,593,503

[72] Inventor Paul D. Andrews
     Dormont, Pa.
[21] Appl. No. 828,206
[22] Filed May 27, 1969
[45] Patented July 20, 1971
[73] Assignee Mine Safety Appliances Company
     Pittsburgh, Pa.

[54] SIDE-LOADING FILTERING APPARATUS
     5 Claims, 7 Drawing Figs.
[52] U.S. Cl. .................................................. 55/481,
     55/493, 55/496, 55/504, 55/509, 74/89.15
[51] Int. Cl. .................................................. B01d 27/08
[50] Field of Search ....................................... 55/478-
     —481, 490, 496, 493, 504, 509; 210/241, 242,
     325, 324; 74/89.15, 89.14, 99; 104/287;
     254/126

[56]            References Cited
                UNITED STATES PATENTS
900,237   10/1908   Trent ............................. 254/126

| 2,853,153 | 9/1958 | Sexton | 55/481 |
| 3,064,818 | 11/1962 | Kasten | 210/238 |
| 3,354,616 | 11/1967 | Lucas | 55/96 |
| 3,393,498 | 7/1968 | Schoen | 55/493 |
| 3,423,908 | 1/1969 | Hart | 55/481 |
| 3,434,269 | 3/1969 | Hyatf | 55/490 |

Primary Examiner—Frank W. Lutter
Assistant Examiner—Bernard Nozick
Attorney—Brown, Murray, Flick & Peckham ABSTRACT: Filter-clamping mechanism in a side-loading filter housing includes means extending across the housing for applying pressure to the back of a filter. A screw behind such means and parallel to it has right- and left-hand threads on which nuts are mounted. Extending forward from the nuts and inclined laterally relative to each other are links that are pivotally connected to the nuts and the pressure-applying means on vertical axes. When the screw is turned to cause the links to approach parallelism, the pressure-applying means is moved forward to press a filter against a sealing flange in the front of the housing.

INVENTOR.
PAUL D. ANDREWS
BY
Brown, Murray, Flick & Peckham
ATTORNEYS.

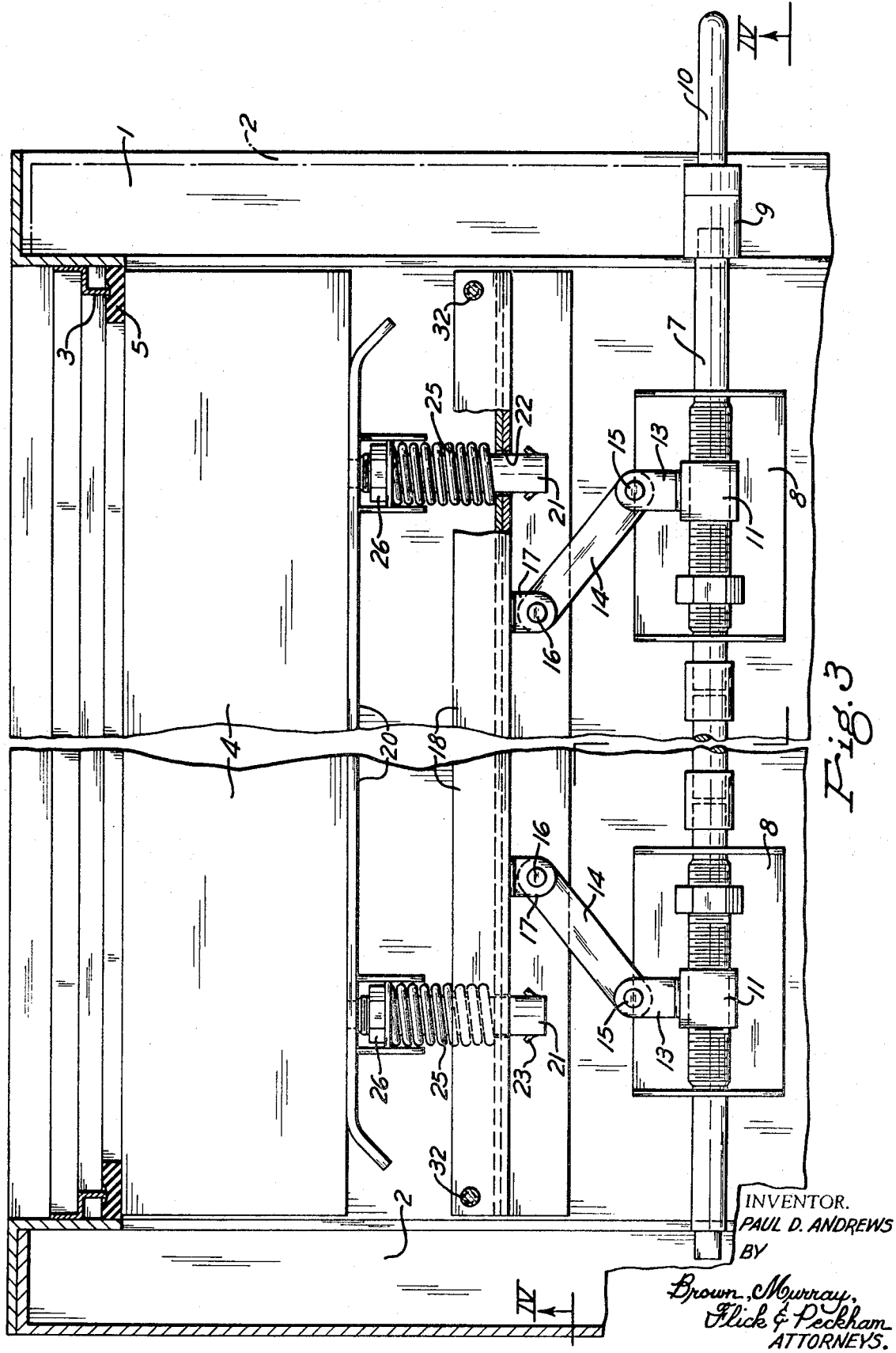

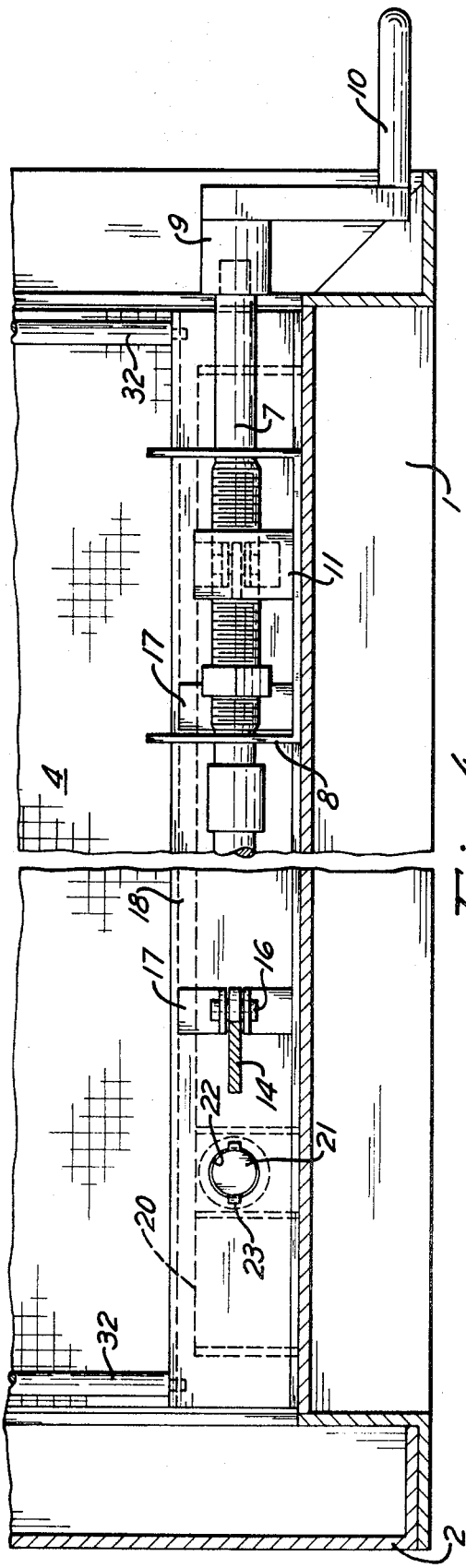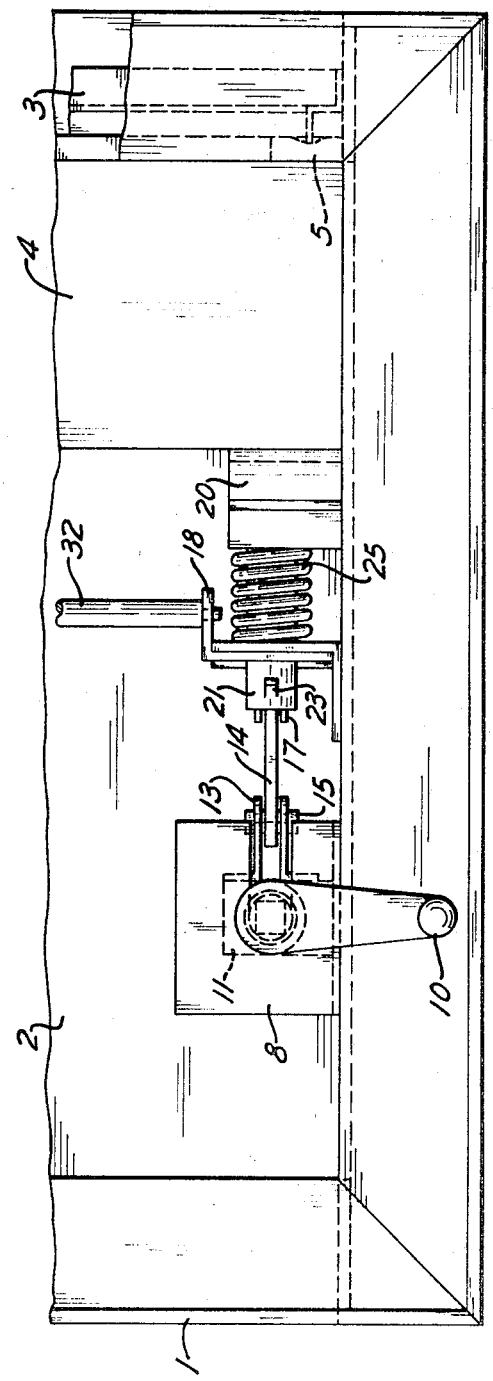

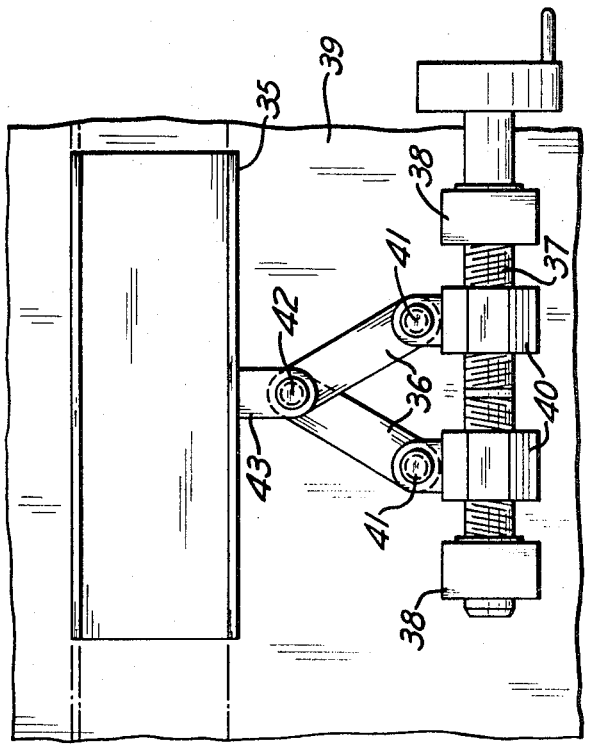
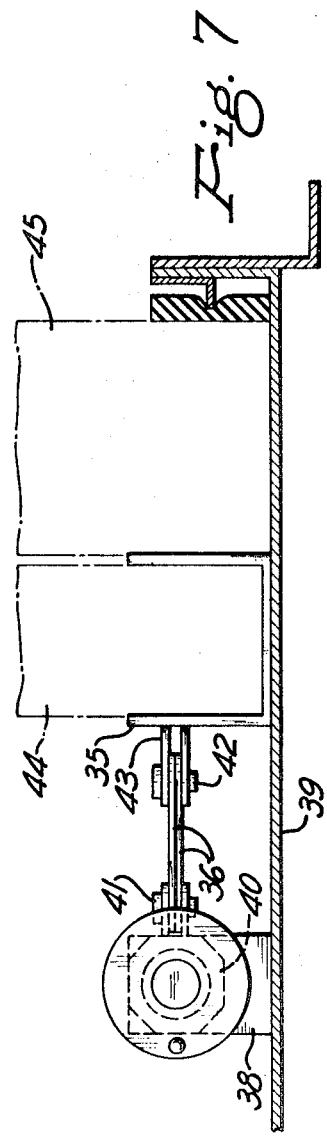
INVENTOR.
PAUL D. ANDREWS
BY
Brown, Murray, Flick & Peckham
ATTORNEYS.

SIDE-LOADING FILTERING APPARATUS

Most filter housings receive their filters from the back. The means for holding the filters in the housings are used for pressing them forward against sealing flanges. Some filter housings, however, receive their filters from one side equipped with a door. Closing of that door obviously does not press a filter forward, so special means must be provided between the back of the filter and the back of the housing to push the filter forward against the sealing flange. Such filter-clamping means are shown in U.S. Pat. No. 3,423,908, for example, but it is an object of this invention to provide an improvement in which the pressure is applied to the filter more uniformly and without danger of damaging it.

The invention is illustrated in the accompanying drawings, in which

FIG. 3 is an enlarged fragmentary horizontal section taken on the line III–III of FIG. 1;

FIG. 4 is a vertical section taken on the line IV–IV of FIG. 3;

FIG. 5 is an enlarged side view of the lower part of the apparatus as shown in FIG. 2;

FIG. 6 is a view similar to FIG. 3 of a modification, and

FIG. 7 is a view similar to FIG. 5 of the modification.

Figure 1:
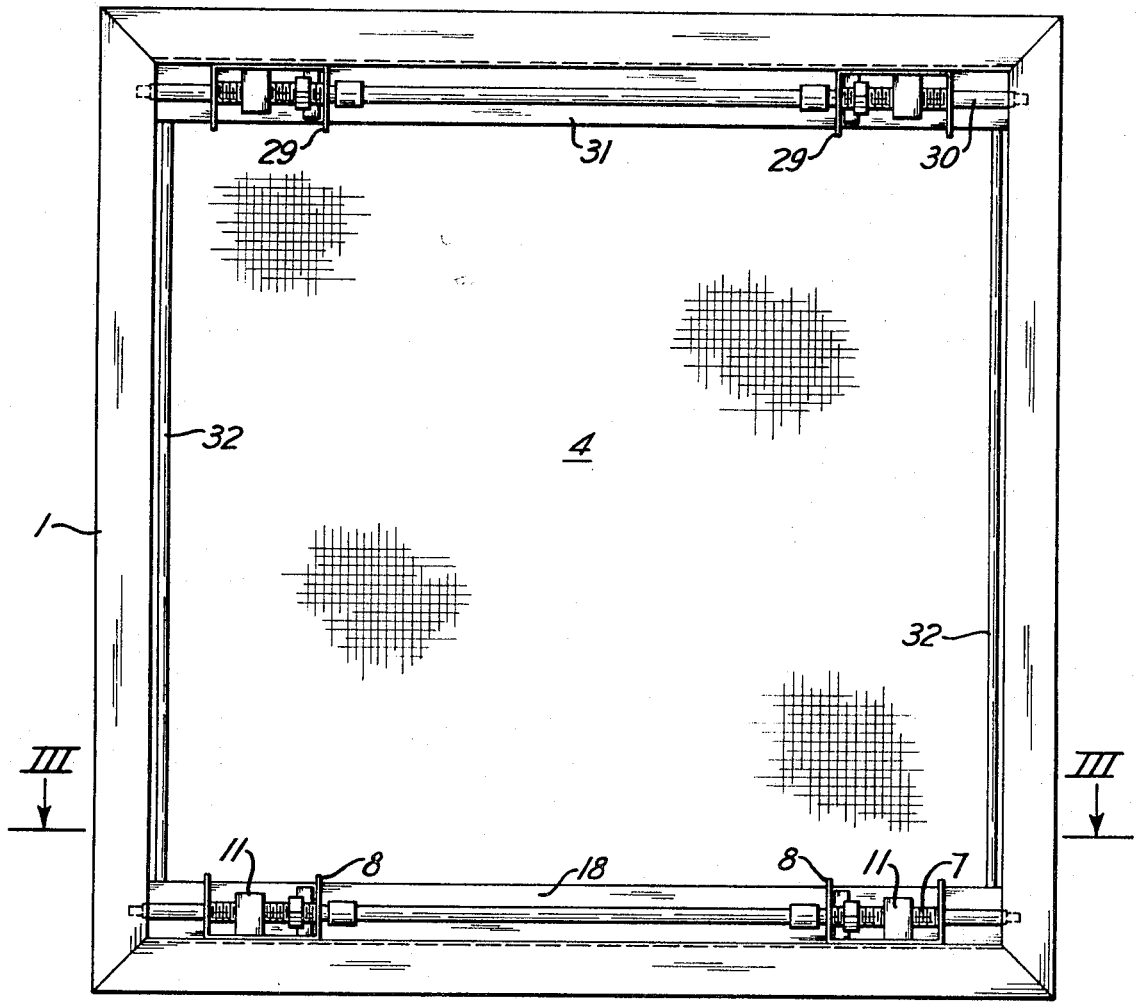
FIG. 1 is a rear view of the filtering apparatus.
Figure 2:
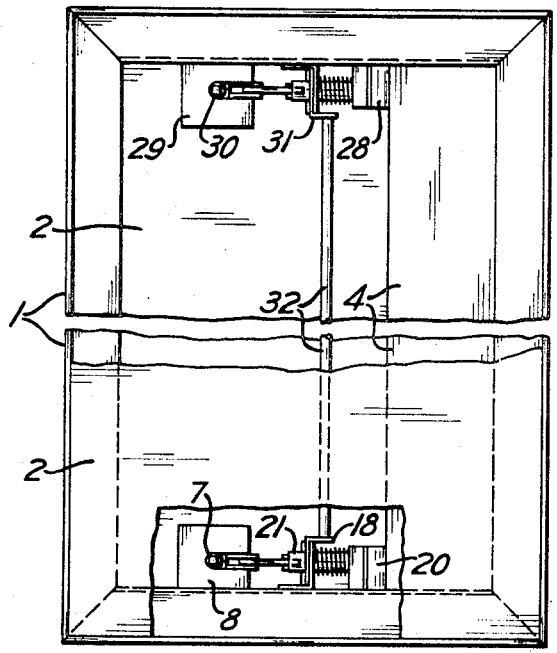
FIG. 2 is a fragmentary view of one side of the apparatus with the door broken away.

Referring to FIGS. 1 to 5 of the drawings, a rectangular filter housing 1 is open at its front and rear ends, but the sides are normally closed and sealed by removable doors 2 that can be held in place in any suitable manner. If desired, one side could be permanently closed so that only one door would be necessary. Secured inside the front end of the housing is a sealing flange 3 that extends entirely around the front opening. When one of the doors is removed, a filter 4 of any suitable construction is inserted laterally into the housing behind the sealing flange. As shown in FIG. 3, the front of the filter may carry a sealing gasket 5 for direct engagement with the flange, or the gasket may be permanently mounted in the housing. In one case the gasket would be part of the filter, and in the other case part of the sealing flange.

It is a feature of this invention that means are provided for clamping the filter against the sealing flange. Accordingly, clamping mechanisms are mounted in the housing behind the filter. The two mechanisms are substantially identical, with one being mounted on the floor of the housing and the other being supported at the top of the housing. The one at the bottom now will be described.

Near the back of the filter housing and spaced some distance behind the filter when it is in its forward position, there is a screw 7 that is journaled in brackets 8 secured to the floor of the housing. The screw extends from side to side of the housing and has polygonal end portions for receiving a registering socket 9 mounted on the inner end of a crank 10 that can be applied to the screw when the appropriate door is opened. As shown in FIG. 3, the screw is provided in longitudinally spaced areas with right- and left-hand threads and registering with each of these threads is a nut 11 slidable along the base of one of the brackets 8. When the screw is turned by the crank, the nuts will be moved toward or away from each other.

Projecting forward from the two nuts are brackets 13 that can be welded to the nuts or be integral projections thereof. The rear ends of rigid links 14 are pivotally mounted in these brackets on vertical pins 15. The front ends of the links are pivotally mounted on vertical pins 16 extending through brackets 17 secured to the back of a pressure bar 18 that extends across the housing parallel to the screw. This bar rests on the floor of the housing but is not fastened to it. The bar may take various cross-sectional shapes, the one shown being formed from two overlapping angle bars to provide it with a rearwardly extending bottom flange and a forwardly extending top flange. The front ends of the links are closer together than their rear ends so that the links are inclined forward toward each other, although the same results can be obtained if the front ends are further apart than the rear ends. In either case the two links are inclined to the same extent. When the nuts are moved toward each other, they tend to swing the links that are shown into more nearly parallel relation, so the links push the pressure bar forward toward the filter.

The pressure bar is spaced from the filter and in the space between them there is a filter contact bar 20, which also rests on the floor of the housing. This bar is spaced from the pressure bar and engages the back of the bottom part of the filter. Secured to the contact bar and extending rearwardly from it, there are two or more rods 21 that extend slidingly back through openings 22 in the pressure bar. The rear ends of these rods are provided with suitable lateral projections 23 or the like to prevent them from being withdrawn from the pressure bar. Encircling each rod between the two bars is a coil spring 25 which urges the contact bar forward away from the pressure bar. The pressure exerted by the springs can be adjusted by nuts 26 on the screw-threaded front ends of the rods. The two bars and the coil springs constitute pressure-applying means for the filter.

Before a filter is inserted in the housing, screw 7 is rotated to move the nuts on it away from each other and thereby retract the pressure bar, which will pull the contact bar back with it. The filter then is inserted from an open side of the housing and then the screw is turned in the opposite direction to move the rear ends of the links toward each other so that they will push the two bars forward. The contact bar will be more or less stopped when it engages the back of the filter, but by continuing to rotate the screw, the pressure bar is moved further forward. This compresses the coil springs and causes them to press the contact bar tightly against the filter. This constant spring pressure of the contact bar against the filter will maintain the latter tight against the front sealing flange even though the filter in time tends to become compressed to some extent.

At the same time that the clamping mechanism just described is operated to press the contact bar against the bottom part of the filter, the second like clamping mechanism at the top of the housing is operated to press its contact bar 28 against the back part of the top of the filter. The brackets 29 that support the screw 30 of this upper mechanism are secured to the top wall of the housing. Since the pressure bar 31 and the contact bar are not secured to that wall, provision is made for supporting them from the bottom pressure bar. This can be done by vertical rods 32 connecting the two pressure bars.

It will be seen that these clamping mechanisms exert constant pressure against the filter and that they exert it uniformly across it because the contact bars engage flat against the back of the filter over an area of considerable length. The filter-engaging means are not small elements that can sink into the filter or penetrate it.

In the modification shown in FIGS. 6 and 7, the filter contact bar 35 itself is connected by pivoted links 36 to a screw 37 behind it. The screw is mounted in bearings 38 secured to the floor of a filter housing 39 and has right- and left-hand threads on which nuts 40 are mounted. The links are connected by vertical pivot pins 41 to the two nuts. The front ends of the links are mounted on a common pivot pin 42 in a bracket 43 projecting from the back of the contact bar. This filter-clamping mechanism contains no springs. The contact bar, preferably, is a channel that can receive a prefilter 44 and move it forward against the main filter 45 ahead of it when the nuts are screwed more closely together.

I claim:

1. In combination with a rectangular side-loading filter housing having open front and rear ends and a side access door, the front end of the housing having an inwardly extending sealing flange around it for engagement by the front of a filter in the frame of a filter-clamping mechanism comprising a filter contact bar in the housing extending across the bottom thereof and movable forward and backward, a screw journaled in the housing behind said bar and parallel thereto, the screw having right- and left-hand threads, a nut registering with each of said threads, a pressure bar between the contact bar and said screw, links extending forward from the nuts and inclined laterally relative to each other, means pivotally connecting the ends of the links to the nuts and said pressure bar on vertical axes, springs between the two bars to resist movement of the bars toward each other, means for turning the screw to cause the links to approach parallelism, whereby to move said bars forward to press the contact bar against the back of the lower part of a filter, a second filter-clamping mechanism substantially the same as said just-mentioned mechanism, and means for supporting the second mechanism in said housing above the first mechanism for pressing against the upper part of a filter.

2. In the combination recited in claim 1, said means for supporting said second clamping mechanism including vertical members connecting said pressure bar with the pressure bar of the second mechanism above it.

3. In the combination recited in claim 1, said pressure bar being provided with a plurality of longitudinally spaced openings, rods extending slidingly through said openings and secured to the contact bar, and said springs being coils mounted on said rods between the two bars and pressing against them.

4. In the combination recited in claim 3, said means for supporting said second clamping mechanism including vertical rods connecting said pressure bar with the pressure bar of the second mechanism above it.

5. In combination with a rectangular side-loading filter housing having open front and rear ends and a side access door, the front end of the housing having an inwardly extending sealing flange around it for engagement by the front of a filter in the frame of a filter-clamping mechanism comprising a filter contact bar in the housing extending crosswise thereof and movable forward and backward, a screw journaled in the housing behind said bar and parallel thereto, nuts mounted on said screw, a pressure bar between the contact bar and screw, links extending forward from the nuts and inclined lengthwise of the screw, means pivotally connecting the ends of the links to the nuts and said pressure bar on vertical axes, spring means between said bars to resist movement of the bars toward each other, and means for turning the screw to cause the links to approach being perpendicular to the screw, whereby to move said bars forward to press the contact bar against a filter in front of it.